United States Patent
Baldasarre et al.

(10) Patent No.: US 8,973,439 B1
(45) Date of Patent: Mar. 10, 2015

(54) MEMS ACCELEROMETER WITH PROOF MASSES MOVING IN ANTI-PHASE DIRECTION NORMAL TO THE PLANE OF THE SUBSTRATE

(71) Applicant: InvenSense, Inc., San Jose, CA (US)

(72) Inventors: Leonardo Baldasarre, Alkmaar (NL); Matthew J. Thompson, Beaverton, OR (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/188,173

(22) Filed: Feb. 24, 2014

Related U.S. Application Data

(60) Provisional application No. 61/920,246, filed on Dec. 23, 2013.

(51) Int. Cl.
*G01C 19/00* (2013.01)
*G01P 3/44* (2006.01)
*G01C 19/56* (2012.01)

(52) U.S. Cl.
CPC .................................... *G01C 19/56* (2013.01)
USPC ....................................................... 73/504.12

(58) Field of Classification Search
USPC ........................................................ 73/514.12
See application file for complete search history.

(56) References Cited

U.S. PATENT DOCUMENTS

| | | | |
|---|---|---|---|
| 6,230,563 B1 * | 5/2001 | Clark et al. | 73/504.04 |
| 2011/0005318 A1 * | 1/2011 | Dwyer et al. | 73/514.31 |

* cited by examiner

*Primary Examiner* — Hezron E Williams
*Assistant Examiner* — Gregory J Redmann
(74) *Attorney, Agent, or Firm* — Sawyer Law Group, P.C.

(57) ABSTRACT

A sensor is disclosed. The sensor includes a substrate and at least two proof masses. The sensor also includes a flexible coupling between the at least two proof masses and the substrate. The at least two coupling proof masses move in an anti-phase direction normal to a plane of the substrate in response to acceleration.

22 Claims, 13 Drawing Sheets

US 8,973,439 B1

MEMS ACCELEROMETER WITH PROOF MASSES MOVING IN ANTI-PHASE DIRECTION NORMAL TO THE PLANE OF THE SUBSTRATE

CROSS-REFERENCE TO RELATED APPLICATION

This application claims benefit under 35 USC 119(e) of U.S. Provisional Patent Application No. 61/920,246, filed on Dec. 23, 2013, entitled "MEMS ACCELEROMETER WITH PROOF MASSES MOVING IN ANTI-PHASE DIRECTION NORMAL TO THE PLANE OF THE SUBSTRATE," which is incorporated herein by reference in its entirety.

FIELD OF THE INVENTION

The present invention relates generally to inertial sensors and more particularly to MEMS accelerometers.

BACKGROUND

Inertial sensors such as accelerometers are widely used for motion sensing applications. Conventionally, an accelerometer consists of a suspended proof mass and a means of measuring the proof mass displacement with respect to the reference frame. There is always a need to provide improvements in the performance and reliability of an accelerometer for commercial applications. Typically, performance is determined by the mechanical and electrical sensitivities of the sensor and reliability is determined, among many other parameters, by the required breakout force to unstuck moving parts of the structure in case of accidental contact with other fixed or moving parts.

What is needed therefore is a system and method that provides such inertial sensors. The method and system should be easily implemented, cost effective and adaptable to existing environments. The present invention addresses the above-identified issues.

SUMMARY

A sensor is disclosed. In a first aspect, the sensor includes a substrate and at least two proof masses. The sensor also includes a flexible coupling between the at least two proof masses and the substrate. The at least two coupling proof masses move in an anti-phase direction normal to a plane of the substrate in response to acceleration.

In a second aspect, a combined accelerometer and a magnetometer includes a substrate and at least two proof masses. The combined accelerometer and the magnetometer also includes a flexible coupling between the two proof masses and the substrate. The proof masses move in an anti-phase direction normal to a plane of the substrate in response to acceleration. The combined accelerometer and the magnetometer also includes a magnetic material that causes the combined accelerometer and magnetometer to rotate around a first axis in response to a magnetic field. The acceleration and magnetic field can be sensed separately because they have two different sensing modes, respectively the anti-phase movement of the proof masses and the tilting around the first axis of the proof masses. For instance outputs of the combined accelerometer and magnetometer can be measured by altering the configuration of transducer to sense separate the outputs given by the acceleration and magnetic field.

DETAILED DESCRIPTION

The present invention relates generally to inertial sensors and more particularly to MEMS accelerometers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In the described embodiments micro-electro-mechanical systems (MEMS) refers to a class of structures or devices fabricated using semiconductor-like processes and exhibiting mechanical characteristics such as the ability to move or deform. MEMS devices often, but not always, interact with electrical signals. MEMS devices include but are not limited to gyroscopes, accelerometers, magnetometers, pressure sensors, microphones, and radio-frequency components. Silicon wafers containing MEMS structures are referred to as MEMS wafers.

In the described embodiments, the MEMS device may refer to a semiconductor device implemented as a micro-electro-mechanical system. The MEMS structure may refer to any feature that may be part of a larger MEMS device. The semiconductor layer with the mechanically active MEMS structure is referred to as the device layer. An engineered silicon-on-insulator (ESOI) wafer may refer to a SOI wafer with cavities beneath the silicon device layer or substrate. A handle wafer typically refers to a thicker substrate used as a carrier for the thinner silicon device substrate in a silicon-on-insulator wafer. A handle substrate and a handle wafer can be interchanged.

In the described embodiments, a cavity may refer to an opening or recession in a substrate wafer and an enclosure may refer to a fully enclosed space. A post may be a vertical structure in the cavity of the MEMS device for mechanical support. A standoff is a vertical structure providing electrical contact.

In the described embodiments, a rigid structure within a MEMS device that moves when subject to force may be referred to as a plate. Although rigid plates are preferred for the described embodiments, semi rigid plates or deformable membranes could replace rigid plates. Plates may comprise of silicon, silicon containing materials (e.g. poly-silicon, silicon oxide, silicon nitride), metals and materials that are used in semiconductor processes (e.g. aluminum nitride, germanium). A back plate may be a solid or perforated plate comprising at least one electrode. The electrode can be comprised of semiconductor process compatible conductive materials (e.g. poly-silicon, silicon, aluminum, copper, nickel, titanium, chromium, gold). The electrodes may have insulating films on one or more surfaces.

Figure 1:
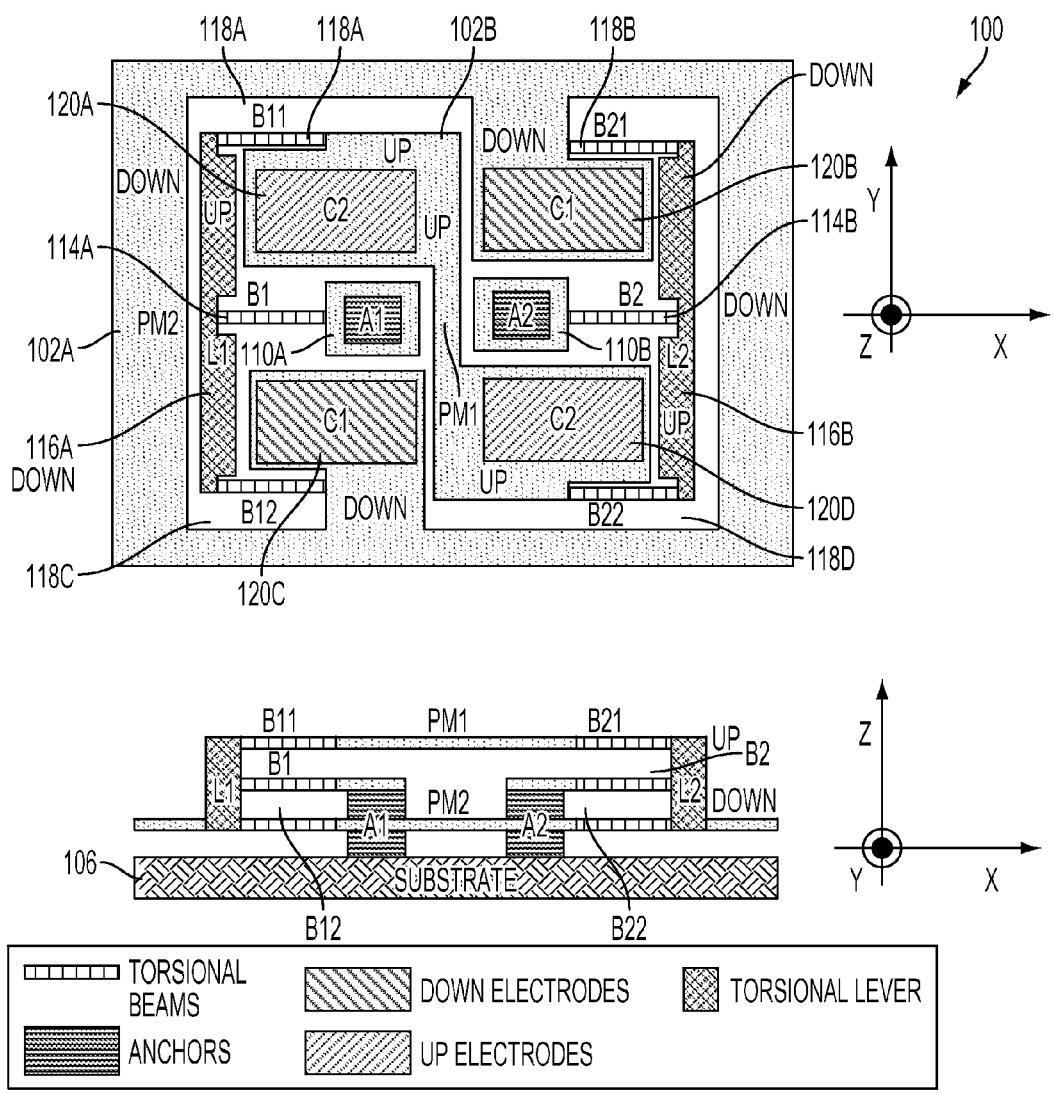
FIG. 1 shows an accelerometer that responds to a linear acceleration in a Z direction.

FIG. 1 shows top and side views of an accelerometer 100 that responds to a linear acceleration in a Z direction. The accelerometer 100 comprises two proof masses PM1 102B and PM2 102A that respond to a linear acceleration in the Z direction by moving in anti-phase direction normal to a plane of a substrate 106. The anti-phase movement is constrained by a flexible coupling between the two proof masses PM1 102B and PM2 102A and the substrate 106. The flexible coupling comprises two separated anchors A1 110A and A2 110B, two central torsional springs B1 114A and B2 114B, two rotational levers L1 116A and L2 116B and four external torsional springs B11 118A, B21 118B, B12 118C and B22 118D. The motion of the accelerometer 100 is measured by an out-of-plane transducer on the proof masses, for instance a set of capacitive differential electrode C1 and C2 120A-120D.

The springs B1 114A and B2 114B connect the anchors A1 110A and A2 110B to the levers L1 116A and L2 116B. The four external torsional springs B11 118A, B21 118B, B12 118C and B22 118D connect the end of one lever to the end of the other lever on the opposite side trough the two proof masses PM1 102B and PM2 102A. In particular spring B11 118A connects the top of the left lever L1 116A to internal proof mass PM1 102B that connects the bottom of the right lever L2 116B trough the spring B22 118D. In the same way the bottom of the left lever L1 116A is coupled to the top of the right lever L2 116B with the springs B12 118C and B22 118D.

For simplicity, suppose that the proof masses have the center of gravity on the axis of the central springs (B1 114A and B2 114B) and that the external springs (B12 118C, B21 118B, B11 118A and B22 118D) are coupled to the proof masses with the same distance from the center of gravity orthogonal to this axis. A more general case is described in the following.

A linear acceleration a in the Z direction will create a force in Z for each proof mass:

$$F_{PM_1} = m_1 a$$

$$F_{PM_2} = m_2 a$$

Where $m_1$ and $m_2$ are the masses of PM1 102B and PM2 102A respectively. On each proof mass half of this force acts on each one of the external springs, B11 118A and B22 118D for PM1 102B and B12 118C and B21 118B for PM2 102A. Finally this force is transferred on the extreme of the lever so in the center of the lever there is a torque that is the difference of this force times the lever of PM1 102B and PM2 102A:

$$M = \frac{m_1 a}{2}\Big|_{PM1} - \frac{m_2 a}{2}\Big|_{PM2}$$

where the lever length of PM1 $l_{PM1}$ is the distance from the springs B11 118A to B1 114A and B22 118D to B2 114B and $l_{PM2}$ is the distance from the springs B12 118C to B1 114A and B21 118B to B2 114B. The torque M causes the central springs and the two levers to rotate in anti-phase and so one proof mass moves towards the substrate and the other moves in the opposite direction.

In order to cause the anti-phase movement there must be an unbalancing torque M. This unbalanced torque M can be given by a difference in the mass ($m_1 \neq m_2$), by difference in the lever ($l_{PM1} \neq l_{PM2}$), or by a difference in the mass lever product ($m_1 l_{PM1} \neq m_2 l_{PM2}$).

In a more general example, where the center of gravity of the mass is not lying on the spring axis or the external springs are not coupled to proof masses with the same distance orthogonal to this axis, the acceleration cause a torque in addition to the force in the Z direction. In this case the structure of sensor also rotates. The sensor also includes a transducer to measure the motion of the sensor. For instance capacitive sensing can be performed by means of electrodes on the substrate measuring the capacitance change due to the mass motion.

Single Anchor Accelerometer

Figure 2:
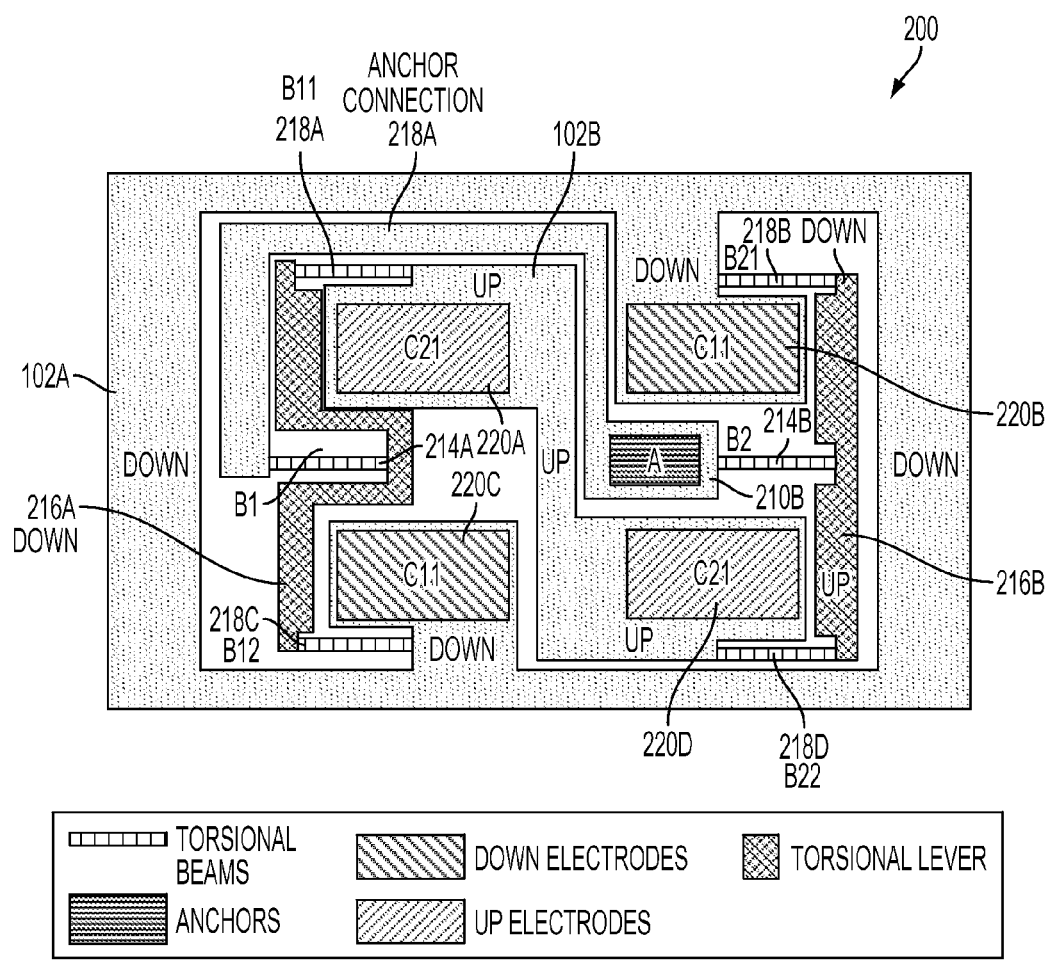
FIG. 2 shows a single anchor accelerometer in accordance with an embodiment.

FIG. 2 shows a single anchor accelerometer 200 in accordance with an embodiment. The single anchor comprises an anchor A 210B, two central springs B1 214A and B2 214B, torsional springs B11 218A, B21 218B, B12 218C and B22 218D, rotational levers 216A and 216B, DOWN electrodes C11 220B and C11 220C, and UP electrodes C21 220A and C21 220D. In this embodiment as is seen there is only one anchor A 210B that connects the two central springs B1 214A and B2 214B.

Single Lever Design

Figure 3:
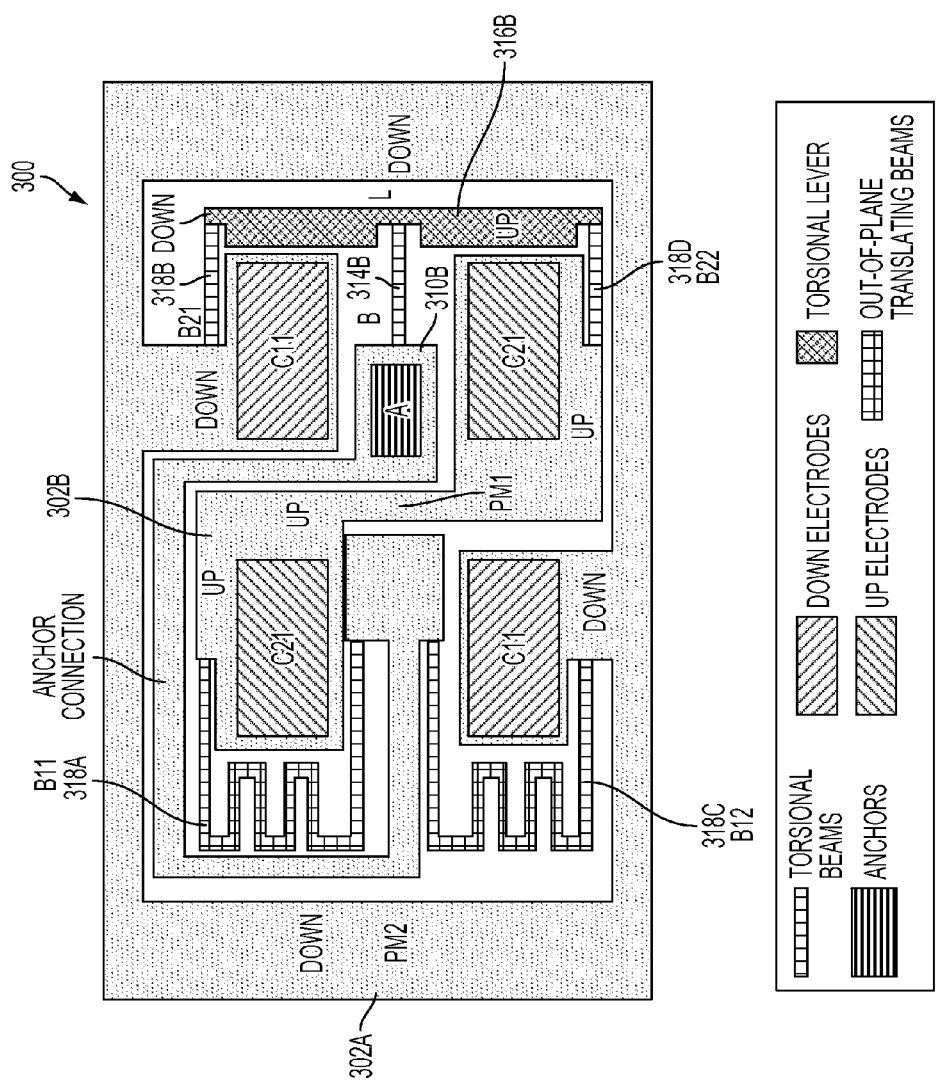
FIG. 3 shows a single lever and single anchor accelerometer in accordance with an embodiment.

FIG. 3 shows a single lever and single anchor accelerometer 300 in accordance with an embodiment.

The spring B 314B connects the anchor A 310B to the lever L 316B. The two external torsional springs B21 318B and B22 318D connect the end of the lever to the two proof masses PM1 302B and PM2 302A. The two proof masses are coupled to the substrate with two translating out-of-plane springs.

The two translating springs B11 318A and B12 318C must be stiff for rotation around X to have the two proof masses moving in anti-phase direction normal to the plane of the substrate. If those springs are compliant for rotation around the X axis then the sensor 300 rotates around X axis.

A linear acceleration cause a force on each of the two proof masses PM1 302A ad PM2 302B that is transferred to the lever L 316B and provides a torque on the central spring B 314B. Moreover, if there is an unbalancing in the mass and lever product then the central spring B 314B and the lever L 316B rotate and one of the proof masses moves towards the substrate and the other of the proof masses PM1 302A and PM2 302B moves in the opposite direction.

Alternative Single Lever Accelerometer

Figure 4:
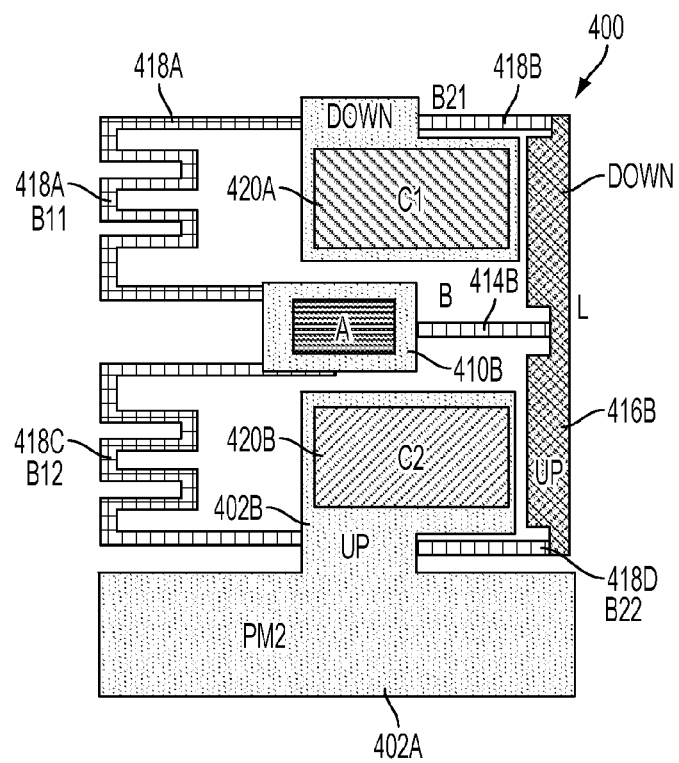
FIG. 4 shows an alternative single lever accelerometer in accordance with an embodiment.
Figure 4:
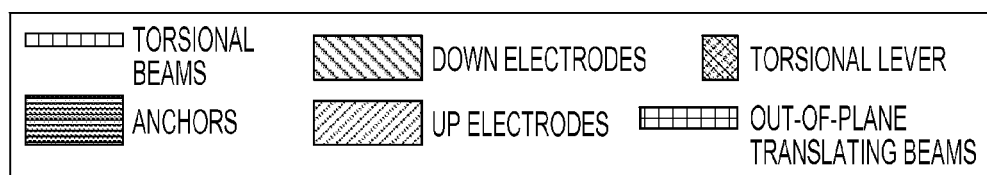

FIG. 4 shows an alternative single lever accelerometer 400 in accordance with an embodiment. The single lever comprises proof masses 402A and 402B, anchor 410B, rotational lever 416B, translating springs B11 418A and B12 418C, torsional springs B21 4188, B 4148 and B22 418D, DOWN electrodes C1 420A, and UP electrodes C2 420B. As explained in FIG. 3, the translating springs B11 418A and B12 418C must stiff for rotation around the X axis to have the two proof masses moving in anti-phase direction normal to the plane of the substrate.

Two MEMS Accelerometers

Figure 5A:
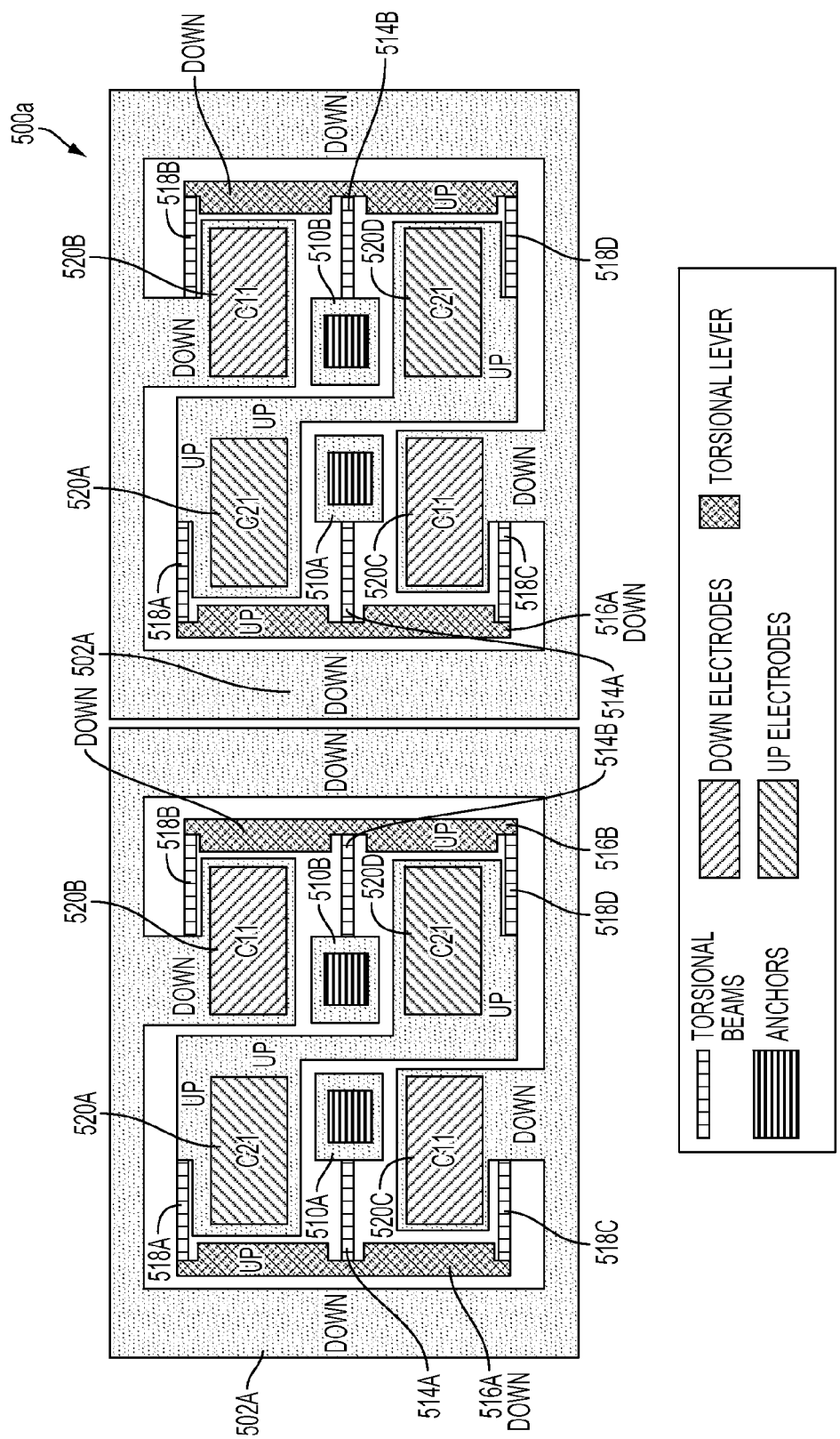
FIG. 5a shows the configuration of the sensor to be a capacitive wheatstone bridge in accordance with an embodiment.
Figure 5B:
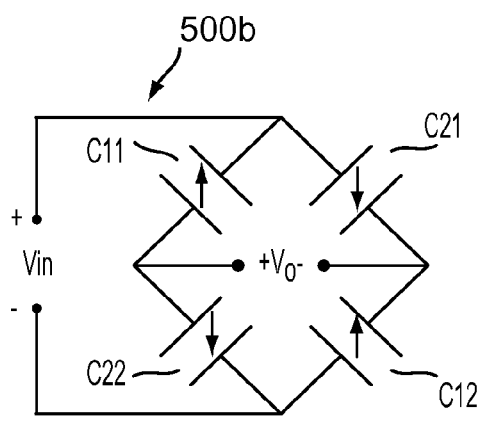
FIG. 5b shows a configuration for sensing acceleration in a Wheatstone bridge configuration as shown in accordance with an embodiment.
Figure 5C:
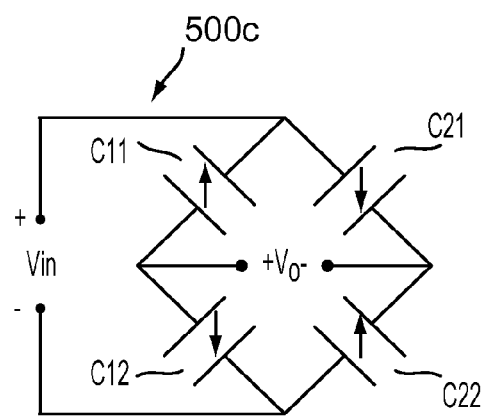
FIG. 5c shows a configuration for sensing magnetic field in a Wheatstone bridge configuration as shown in accordance with an embodiment.

FIG. 5a shows the configuration of the sensor to be a capacitive wheatstone bridge in accordance with an embodiment. FIG. 5b shows a configuration for sensing acceleration in a Wheatstone bridge configuration as shown in accordance with an embodiment. FIG. 5c shows a configuration for sensing magnetic field in a Wheatstone bridge configuration as shown in accordance with an embodiment. FIG. 5a shows the configuration of the sensor to be a capacitive wheatstone bridge in accordance with an embodiment. The sensor 500a comprises proof masses 502A and 502B, anchors 510A and 510B, torsional springs 514A, 514B, 518A, 518B, 518C and 518D, rotational levers 516A and 516B, UP electrodes C21 (FIGS. 5b and 5c) 520A, C21 (FIGS. 5b and 5c) 520D, C22 (FIGS. 5b and 5c) 520A and C22 (FIGS. 5b and 5c) 520D, and DOWN electrodes C11 (FIGS. 5b and 5c) 520B, C11 (FIGS. 5b and 5c) 520C, C12 (FIGS. 5b and 5c) 520B and C12 (FIGS. 5b and 5c) 520C. In response to acceleration the proof masses 502A and 502B moves in an anti-phase direction normal to the substrate increasing the capacitance of capacitors C11 and C12 and decreasing the capacitance of the capacitors C21 and C22. For sensing acceleration, the capacitors C11, C21, C12, and C22 can be connected in a Wheatstone bridge configuration as shown in FIGS. 5b and 5c.

MEMS Accelerometer with Capacitive Readout on Rotational Lever

Figure 6:
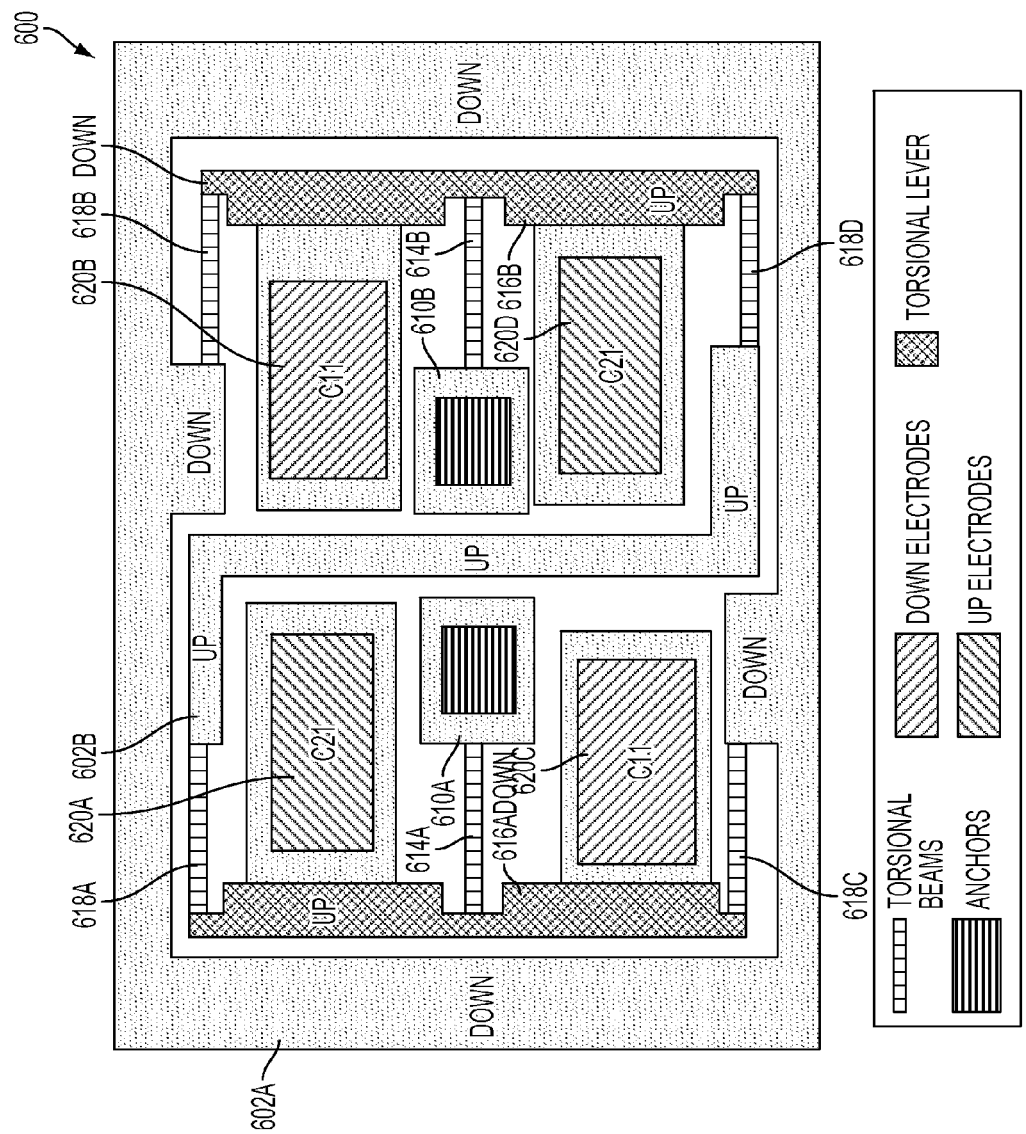
FIG. 6 shows an accelerometer where a capacitive readout is performed on a rotational lever instead on proof masses in accordance with an embodiment.

FIG. 6 shows an accelerometer 600 where a capacitive readout is performed on electrodes on levers instead on proof masses in accordance with an embodiment. The sensor comprises proof masses 602A and 602B, rotational levers 616A and 616B, anchors 610A and 610B, torsional springs 614A, 614B, 618A, 618B, 618C, 618D, UP electrodes C21 620A and C21 620D, and DOWN electrodes C11 620B and 620C. As is seen, the electrodes 620A-620D are utilized to detect movement of the rotational levers 616A and 616B.

MEMS Accelerometer with Tilt Cancellation Paddles

Figure 7:
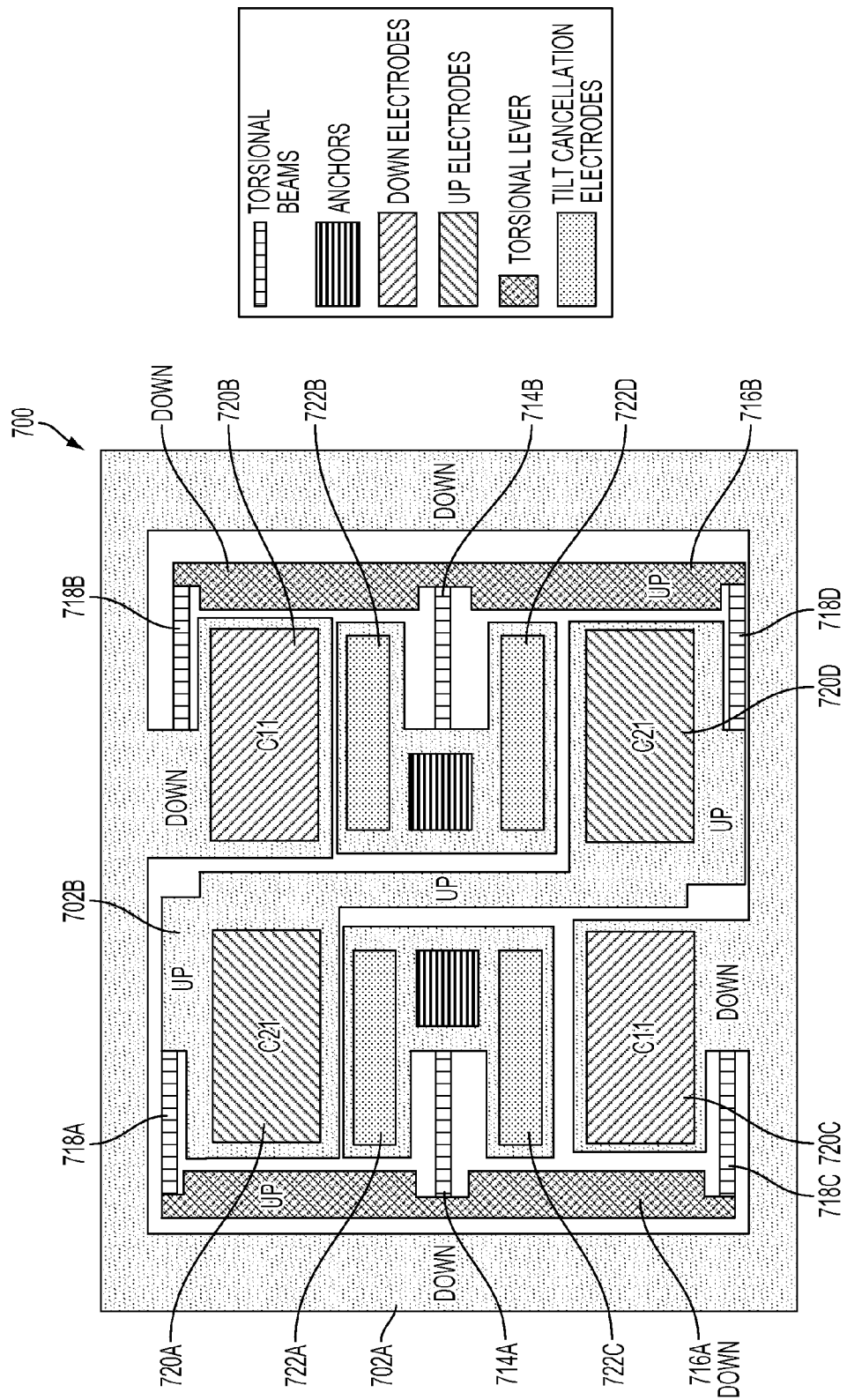
FIG. 7 shows an accelerometer including the tilt cancellation paddles in accordance with an embodiment.

FIG. 7 shows an accelerometer 700 including the tilt cancellation paddles in accordance with an embodiment. The sensor comprises proof masses 702A and 702B, torsional springs 714A, 714B, 718A, 7188, 718C and 718D, rotational levers 716A and 7168, UP electrodes C21 720A and C21 720D, DOWN electrodes C11 720B and C11 720C, and tilt cancellation paddles 722A, 722B, 722C and 722D. The proof masses 702A and 702B move in anti-phase direction normal to the plane of the substrate with the tilt cancellation paddles 722A and 722B. The output induced by a tilt between proof masses and the substrate is canceled by measuring the differential capacitance between tilt cancellation electrodes and UP and DOWN electrodes.

Accelerometer and Magnetometer Sensor with Differential Capacitive Sensing

Figure 8:
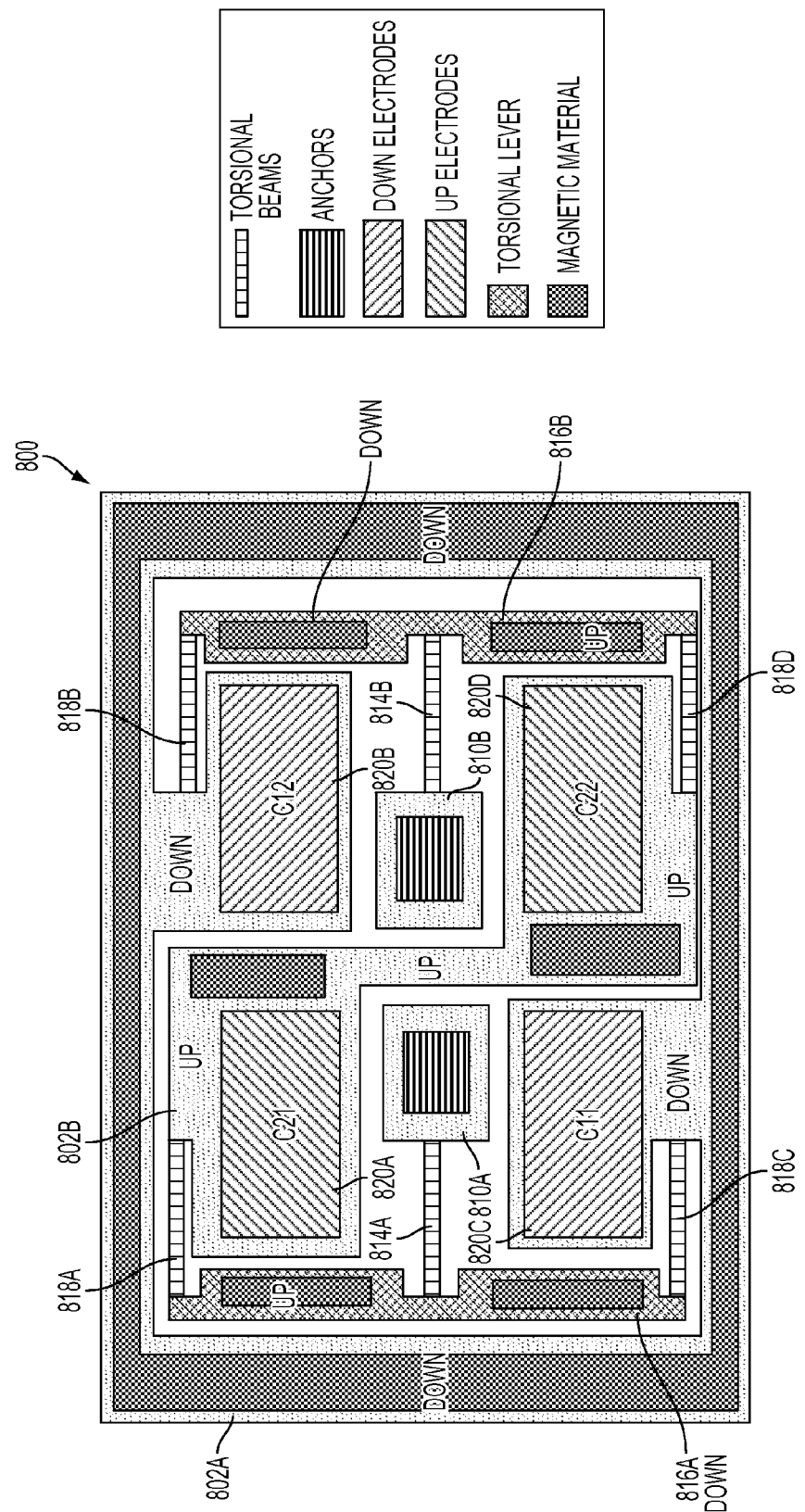
FIG. 8 shows a combined accelerometer and magnetometer sensor in accordance with an embodiment.

FIG. 8 shows a combined accelerometer and magnetometer sensor in accordance with an embodiment. The combined accelerometer and magnetometer sensor 800 comprises proof masses 802A and 802B, anchors 810A and 810B, torsional springs 814A, 814B, 818A, 818B, 818C and 818D, magnetic materials 816A and 816B, UP electrodes C21 820A and C22 820D, and DOWN electrodes C11 820C and C12 820B. The magnetic material induces a torque in response to a magnetic field. This torque will cause the sensor 800 to rotate around x axis. Moreover, acceleration causes the proof masses 802A and 802B to move in anti-phase direction normal to the plane of the substrate.

The acceleration and magnetic field can be sensed separately because they cause two different sensing modes, respectively the anti-phase movement of the proof masses and the tilting around the first axis. For instance the combined accelerometer and magnetometer sensor 800 measures by altering the configuration of a capacitive readout on a circuit shown in FIG. 5b and FIG. 5c. In particular the signals are given by:

$$A_{out} \sim C_{11} + C_{12} - C_{22} - C_{21}$$

$$M_{out} \sim C_{11} - C_{12} + C_{22} - C_{21}$$

where $A_{out}$ is the output given by the acceleration and $M_{out}$ is the output given by the magnetic field.

Placement of Sensing Electrodes when Utilizing a Cap

A cap or a cover provides mechanical protection to a structural layer and optionally forms a portion of an enclosure for the sensor. When utilizing a cap on top of the substrate the sensing electrodes can be located in different areas on the sensor. To describe this feature in more detail refer now to the following discussion in conjunction with the accompanying Figures.

Figure 9:
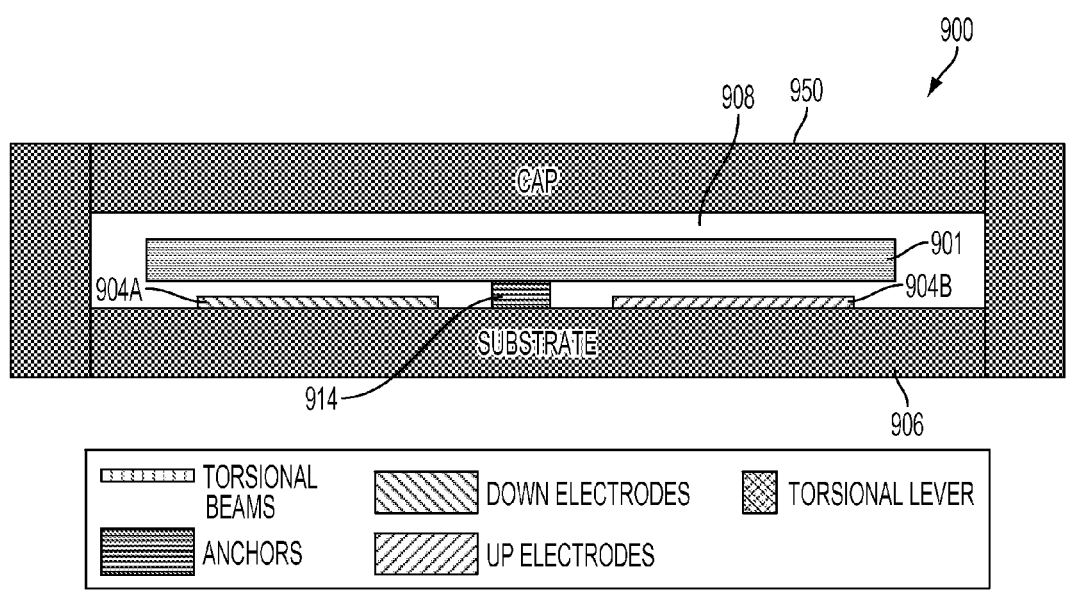
FIGS. 9-12 show a various embodiments of sensors that includes a cap as part thereof.

FIG. 9 illustrates a sensor 900 that includes a substrate 906 with a cap 950 coupled thereover with a sensor structure 901 coupled to the substrate by anchor 914 within a cavity 908 of the sensor. In this embodiment, the UP and DOWN electrodes 904A and 904B are coupled to the substrate 906.

Figure 10:
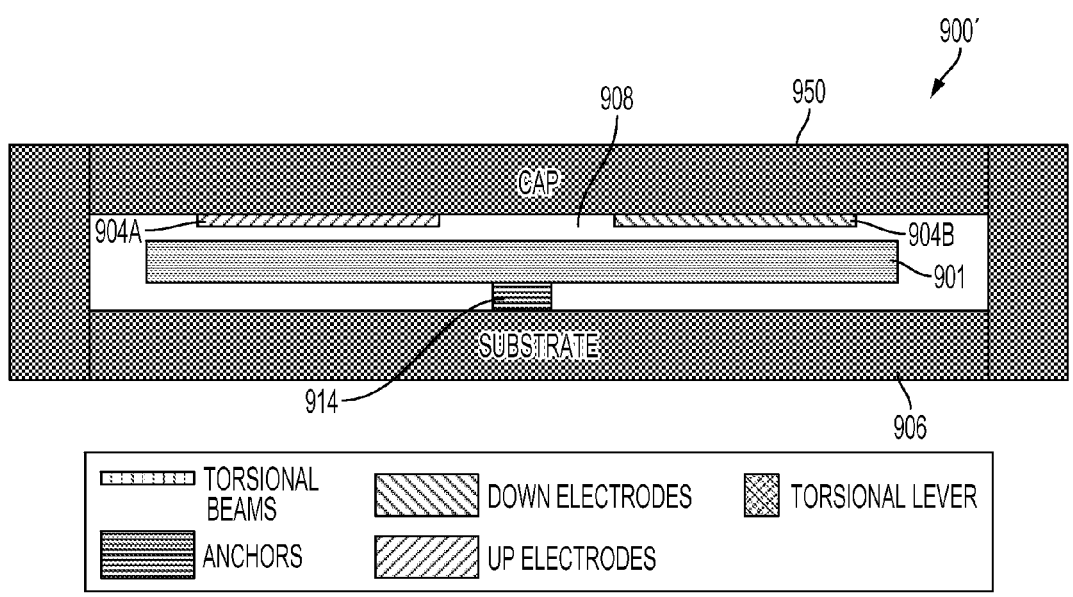
Figure 11:
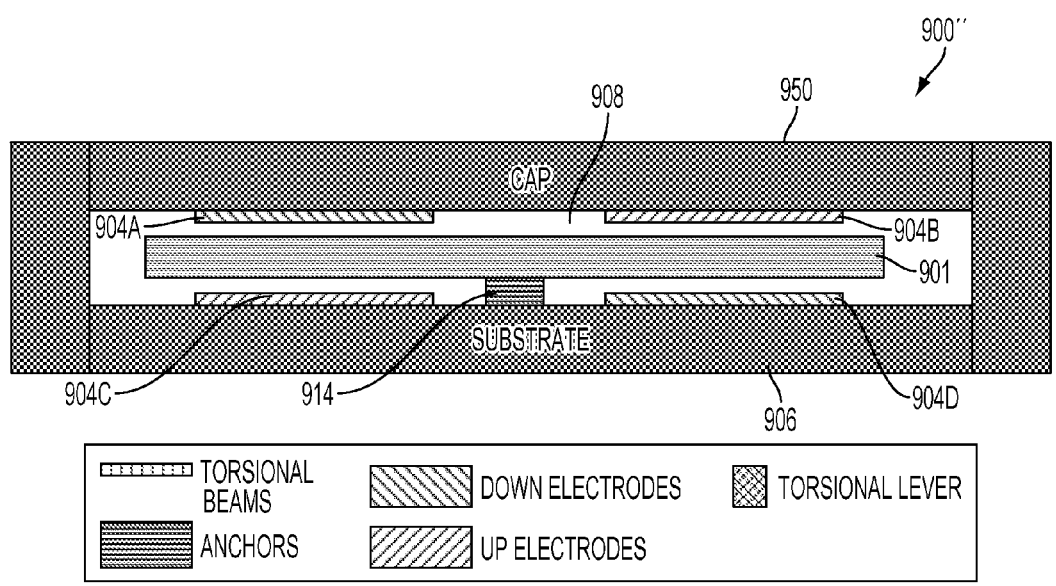
Figure 12:
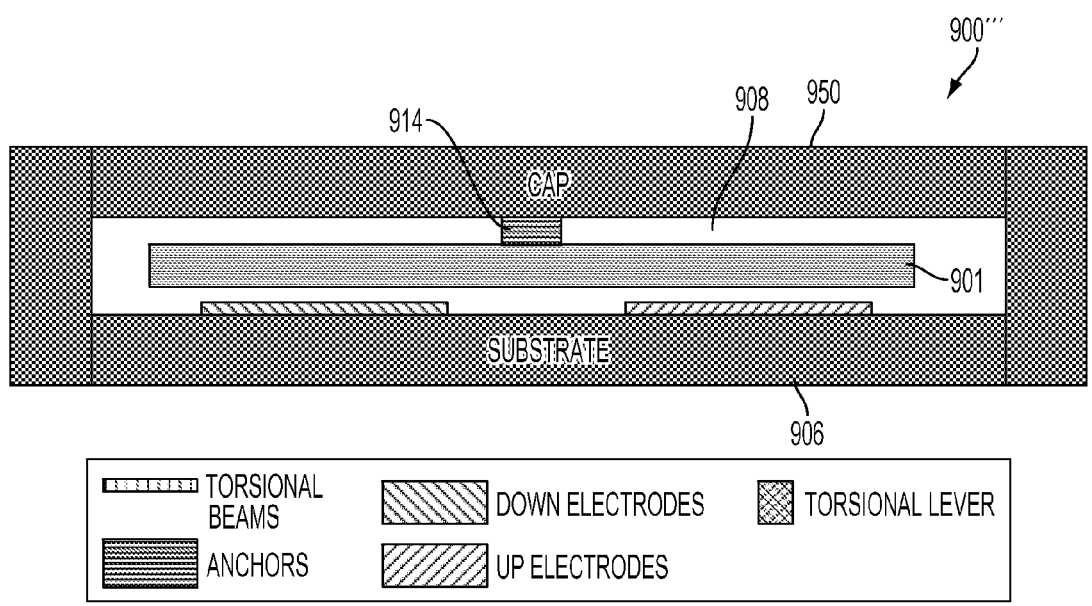

FIG. 10 illustrates a sensor 900' similar to that of FIG. 9 except that the UP and DOWN electrodes 904A and 904B are coupled to the cap. FIG. 11 illustrates a sensor 900" that is also similar to that of FIG. 9 except that an UP electrode 904A and a DOWN electrode 904B are on the substrate and there is a DOWN electrode 904C and an UP electrode 904D on the cap 950. FIG. 12 illustrates a sensor 900''' similar to FIG. 9 except that anchor 914 couples the sensor structure 901 to the cap 950 rather that the substrate 906. As is readily recognized by one of ordinary skill in the art, for example other embodiments could include on the sensor 900''' electrodes 904 on both the cap 950 and the substrate 906 or any combination thereof or one up electrode on the cap and one electrode on the substrate or any combination thereof.

ADVANTAGES

The advantages provided by the anti-phase movement of the proof masses normal to the plane are both a high mechanical sensitivity and a high electrical sensitivity. The high mechanical sensitivity is provided because any part of each proof mass is moving by the same amount and so maximizing the inertia that transduces the acceleration in the force causing the proof masses movement. The high electrical sensitivity is provided also by the translating movement because the gap between the proof masses and the electrodes will reduce or increase everywhere by the same amount maximizing the capacitance change that is the output signal of the transducer. Moreover the movement and so the capacitive readout are differential since the proof masses move in anti-phase.

The high mechanical and electrical sensitivity combined provides a variety of other advantages such as high breakout force, high full scale, high signal to noise ratio, or allow to reduce the size of the sensor by keeping similar performances.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A sensor comprising:
   a substrate; and
   a mechanical structure, wherein the mechanical structure includes
   at least two proof masses including a first proof mass and a second proof mass, and
   a flexible coupling between the at least two proof masses and the substrate; wherein the at least two proof masses move in an anti-phase direction normal to a plane of the substrate in response to acceleration of the sensor via an unbalancing torque.

2. The sensor of claim 1, wherein the flexible coupling further comprises:
   at least one anchor; and
   a torsional system; the torsional system further including an anchoring spring connecting the at least one anchor and a first rotational lever;
   a first torsional spring connects the first proof mass to the rotational lever with a first lever length; and a second torsional spring connects the second proof mass to the first rotational lever with a second lever length.

3. The sensor of claim 2, wherein the first lever length and the second lever length of the first rotational lever are different.

4. The sensor of claim 3, wherein the flexible coupling further includes a second anchoring spring connecting the at least one anchor and a second rotational lever;
   a third torsional spring connects the first proof mass to the second rotational lever with a third lever length; and a fourth torsional spring connects the second proof mass to the second rotational lever with a fourth lever length;
   wherein the second rotational lever rotates counter to the rotation of the first rotational lever in response to acceleration of the sensor.

5. The sensor of claim 4, wherein the third lever length and the fourth lever length of the second rotational lever are different.

6. The sensor of claim 4, further comprising magnetic material, wherein the magnetic material is on any of the at least two proof masses, on the first rotational lever, and the second rotational levers.

7. The sensor of claim 2, further comprising a translational system wherein the translational system includes a first translating spring connecting the at least one anchor to the first proof mass and a second translating spring connecting the at least one anchor to the second proof mass, wherein the first and second translating springs allow motion of the first and second proof masses in a direction normal to the plane of the substrate.

8. The sensor of claim 7, wherein each translating spring comprises a second rotational lever and at least two rotating spring; wherein one of the rotating springs are coupled to the proof mass and other connected to the anchor.

9. The sensor of claim 2, wherein a displacement of the first rotational lever is measured by the transducer via capacitive sensing.

10. The sensor of claim 1, further comprising a transducer for measuring motion of the mechanical structure relative to the substrate.

11. The sensor of claim 10, wherein the motion of the at least two proof masses relative to the substrate is measured by the transducer via capacitive sensing.

12. The sensor of claim 11, wherein the one or more electrodes are located on the substrate.

13. The sensor of claim 11, further comprising a cap, wherein the mechanical structure is located between the cap and the substrate, wherein the one or more electrodes are located on the cap facing the mechanical structure.

14. The sensor of claim 10, wherein the displacement of the coupling springs is measured by the transducer via capacitive sensing.

15. The sensor of claim 1, wherein motion of the at least two proof masses relative to each other are measured by a transducer.

16. The sensor of claim 15, where in the transducer is a capacitive sensor.

17. The sensor of claim 1, wherein the unbalancing torque comprises a difference between a weight of the first proof mass and a weight of the second proof mass.

18. The sensor of claim 1, wherein the flexible coupling includes a lever, wherein the lever has a first length from an anchoring spring to the first proof mass and a second length from the anchoring spring to the second proof mass.

19. The sensor of claim 18, wherein the unbalancing torque comprises either a difference in the first length and the second length or by a difference in a first mass lever product comprising the weight of the first proof mass and the first lever length and a second mass lever product comprising the weight of the second proof mass and the second lever length.

20. A sensor comprising:
    a substrate; and
    a mechanical structure, wherein the mechanical structure includes
    at least two proof masses,
    a flexible coupling between the at least two proof masses and the substrate,
    a magnetic material;
    wherein the mechanical structure rotates around a first axis in response to a magnetic field;
    wherein the at least two proof masses move in an anti-phase direction normal to a plane of the substrate in response to acceleration of the sensor via an unbalancing torque.

21. The sensor of claim 20, further comprising a transducer to measure out-of-plane motion of the mechanical structure; and
    wherein motion due acceleration and motion induced by magnetic field are measured by the transducer.

22. The sensor of claim 20, further comprises a signal processor to alter configuration of the transducer to switch between measuring motion due to acceleration and motion induced by magnetic field.

* * * * *